United States Patent
Tamai

(10) Patent No.: US 12,338,348 B2
(45) Date of Patent: Jun. 24, 2025

(54) THERMAL CONDUCTIVE SILICONE COMPOSITION

(71) Applicant: DuPont Toray Specialty Materials Kabushiki Kaisha, Tokyo (JP)

(72) Inventor: Tomohiro Tamai, Ichihara (JP)

(73) Assignee: DUPONT TORAY SPECIALTY MATERIALS KABUSHIKI KAISHA, Tokyo (JP)

( * ) Notice: Subject to any disclaimer, the term of this patent is extended or adjusted under 35 U.S.C. 154(b) by 391 days.

(21) Appl. No.: 17/931,376

(22) Filed: Sep. 12, 2022

(65) Prior Publication Data

US 2023/0104725 A1    Apr. 6, 2023

(30) Foreign Application Priority Data

Sep. 17, 2021   (JP) ................. 2021-152521

(51) Int. Cl.
| | | |
|---|---|---|
| *C08L 83/04* | (2006.01) | |
| *C08K 3/08* | (2006.01) | |
| *C08K 3/20* | (2006.01) | |
| *C08K 5/5419* | (2006.01) | |
| *C08K 3/22* | (2006.01) | |

(52) U.S. Cl.
CPC ............ *C08L 83/04* (2013.01); *C08K 5/5419* (2013.01); *C08K 2003/0812* (2013.01); *C08K 2003/2296* (2013.01); *C08L 2205/02* (2013.01)

(58) Field of Classification Search
CPC .................................................... C08K 5/5419
See application file for complete search history.

(56) References Cited

U.S. PATENT DOCUMENTS

| | | | |
|---|---|---|---|
| 3,445,420 A | 5/1969 | Kookootsedes et al. | |
| 2011/0163460 A1 | 7/2011 | Kato et al. | |
| 2019/0345291 A1 | 11/2019 | Kato et al. | |
| 2023/0040967 A1* | 2/2023 | Toda | ........................ C08L 83/04 |
| 2023/0257522 A1* | 8/2023 | Brusch | ................. C09D 171/02 |
| | | | 523/456 |
| 2023/0295431 A1* | 9/2023 | Huang | ..................... C08L 83/04 |
| | | | 528/14 |
| 2023/0313016 A1* | 10/2023 | Zheng | ....................... C08K 9/08 |
| | | | 361/706 |
| 2024/0279515 A1* | 8/2024 | Rufus | ..................... C09J 153/02 |

FOREIGN PATENT DOCUMENTS

| | | | | |
|---|---|---|---|---|
| CN | 112480864 A | * | 3/2021 | .............. C09J 11/04 |
| EP | 0764703 A | | 3/1997 | |
| EP | 826732 A2 | * | 3/1998 | .............. C08G 77/08 |
| JP | S5335983 B2 | | 9/1978 | |
| JP | S642627 B2 | | 1/1989 | |
| JP | H112786 A | | 1/1999 | |
| JP | 2001139815 A | | 5/2001 | |
| JP | 2009523856 A | | 6/2009 | |
| JP | 2010059237 A | | 3/2010 | |
| JP | 2015004043 A | | 1/2015 | |
| JP | 6590445 B2 | | 10/2019 | |
| JP | 2020097713 A | | 6/2020 | |
| WO | 2018079215 A1 | | 5/2018 | |

OTHER PUBLICATIONS

Machine translation of JP 2007-032481 (no date).*
Machine translation of CN112480864 (no date).*

* cited by examiner

*Primary Examiner* — Marc S Zimmer
(74) *Attorney, Agent, or Firm* — Lorenz & Kopf LLP

(57) ABSTRACT

A thermally conductive composition comprises: (A) an organopolysiloxane having 2 or more silicon atom-bonded alkenyl groups; (B) an organohydrogenpolysiloxane having 2 or more silicon atom-bonded hydrogen atoms; (C) a thermally conductive filler in an amount of 85 to 95% by mass based on the total mass of the composition; (D) a platinum group metal-based catalyst in an amount of 50 parts by mass or more of a platinum group metal element per 1 million parts by mass total of components (A) and (B); (E) a curing inhibitor having a specific structure, in an amount of 0.3 to 1 part by mass per 100 parts by mass total of components (A) and (B); and (F) a polysiloxane having an $(MeViSiO_{2/2})$ structural unit, a silicon atom-bonded alkoxy group.

7 Claims, No Drawings

THERMAL CONDUCTIVE SILICONE COMPOSITION

CROSS-REFERENCE TO RELATED APPLICATIONS

This application claims priority pursuant to 35 U.S.C. 119(a) to Japanese Application No. 2021-152521, filed Sep. 17, 2021, which application is incorporated herein by reference in its entirety.

TECHNICAL FIELD

The present disclosure relates to a thermally conductive silicone composition.

BACKGROUND ART

In recent years there has been a demand for thermal interface materials with high thermal conductivity, in order to dissipate heat efficiently from electronic devices that handle large volumes of information at high speed. There are various types of thermal interface materials. Adhesive thermal interface materials are generally required to have, simultaneously, high thermal conductivity, plus low viscosity before curing, to ensure sufficient conformability to closely-contacting opposing surfaces, and high adhesive strength between opposing surfaces after curing. One of the basic guidelines for obtaining a thermal interface material with high thermal conductivity is to pack a large amount of high thermal conductivity filler into the resin component. In order to uniformly disperse a large amount of fine filler into the resin component, it can be necessary to mix the resin component and the filler using a high shear force. But this mixing can cause the mixture to generate heat spontaneously.

Patent document 1 (Japanese Unexamined Patent Publication No. 2015-4043) describes a thermally conductive silicone composition obtained by hydrosilylating an organopolysiloxane having at least 2 unsaturated aliphatic hydrocarbon groups per molecule and an organohydrogenpolysiloxane having 2 or more silicon-bonded hydrogen atoms per molecule, in the presence of a platinum group metal catalyst. Patent document 1 also states that the thermally conductive silicone composition may contain an inhibitor chosen from acetylene compounds such as acetylene alcohols, nitrogen compounds, organophosphorus compounds, oxime compounds and organochlorine compounds. The use of a platinum group metal catalyst having a platinum element content of 9 ppm or less relative to the mass of the organopolysiloxane having at least 2 aliphatic unsaturated hydrocarbon groups per molecule is described in the examples in Patent document 1. However, a problem arose when a thermally conductive silicone composition containing a large amount of filler was prepared, in that even when curing inhibitor was present in the thermally conductive silicone composition, the heat generated spontaneously on mixing promoted partial hydrosilylation, and it was difficult to obtain a low viscosity composition.

Therefore, in an attempt to solve the problem caused by spontaneous heat generation on mixing, a curing inhibitor having an ethynyl group or vinyl group in the molecule was added to the thermally conductive silicone composition in a larger amount than usual. Curing inhibitors having an ethynyl group or vinyl group in the molecule are widely known; for example, patent document 2 (Japanese Examined Patent Publication No. S64-2627) mentions a silane compound having 3 ethynyl groups. Patent document 3 (U.S. Pat. No. 3,445,420—Specification) mentions compounds such as 3-methyl-1-butyn-3-ol and $C_6H_5Si(OCH_2C{\equiv}CH)_3$. Patent document 4 (Japanese Examined Patent Publication No. H1-12786) describes organosilicon compounds having 1 or 2 ethynyl groups. Patent document 5 (Japanese Examined Patent Publication No. S53-35983) mentions acetylenic silanes as platinum catalyst inhibitors. Patent document 6 (Japanese Unexamined Patent Publication No. H9-143371) mentions methylvinylbis(3-methyl-1-butyn-3-oxy)silane as an addition reaction inhibitor. Patent document 7 (Japanese Translation of PCT International Application Publication No. 2009-523856) describes the general formula for silylated acetylenic inhibitors having 1-4 carbon-carbon triple bonds.

However, depending on the type of curing inhibitor, it has been necessary to add a large amount of curing inhibitor to the thermally conductive silicone composition. This can be problematic in that it lowers the thermal conductivity of the cured product. Furthermore, in this case, even if the amount of platinum group metal catalyst is increased commensurate with the increased amount of curing inhibitor, there is a problem in that the cured product may not have sufficient die shear strength.

PRIOR ART DOCUMENTS—PATENT DOCUMENTS

[Patent document 1] Japanese Unexamined Patent Publication No. 2015-4043

[Patent document 2] Japanese Examined Patent Publication No. S64-2627

[Patent document 3] U.S. Pat. No. 3,445,420—Specification

[Patent document 4] Japanese Examined Patent Publication No. H1-12786

[Patent document 5] Japanese Examined Patent Publication No. S53-35983

[Patent document 6] Japanese Unexamined Patent Publication No. H9-143371

[Patent Document 7] Japanese Translation of PCT International Application Publication No. 2009-523856

[Patent document 8] European Patent Application Publication No. 0764703A2—Specification

[Patent document 9] Japanese Unexamined Patent Publication No. 2001-139815

[Patent document 10]: Japanese Patent No. 6590445

SUMMARY OF THE INVENTION

Problems to be Solved by the Invention

Therefore the aim of the present invention is to provide a thermally conductive silicone composition containing a large amount of thermally conductive filler, and having low viscosity before curing and high adhesive strength after curing. In order to solve the abovementioned problem, one embodiment of the present invention provides a thermally conductive silicone composition comprising components (A) through (F) below:

an organopolysiloxane having 2 or more silicon-bonded alkenyl groups per molecule and having no silicon-bonded epoxy group-containing organic groups;

(B) an organohydrogenpolysiloxane having 2 or more silicon atom-bonded hydrogen atoms per molecule, in an amount resulting in 0.1 to 2.5 mols of silicon atom-bonded hydrogen atoms in component (B) per mol silicon atom-bonded alkenyl groups in component (A);

(C) a thermally conductive filler in an amount resulting in 85 to 95% by mass based on the total mass of the thermally conductive composition;

(D) a platinum group metal-based catalyst in an amount resulting in at least 50 parts by mass of a platinum group metal element in component (D) per 1 million parts by mass total of components (A) and (B);

(E) one or more curing inhibitors selected from the group consisting of compounds represented by general formula (I) below and compounds represented by general formula (II) below, in an amount resulting in 0.3 to 1 part by mass per 100 parts by mass total of components (A) and (B);

[Chemical Formula 1]

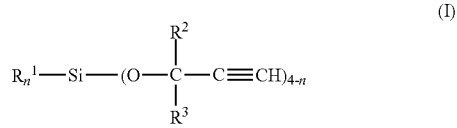

[Chemical Formula 2]

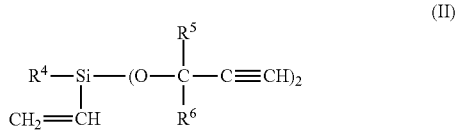

where, in general formula (I), n is 0 or 1, but there is no $R^1$ if n is 0; $R^1$ is a $C_{1-10}$ hydrocarbon group; and $R^2$ and $R^3$ are each independently selected from the group consisting of hydrogen and $C_{1-10}$ hydrocarbon groups, but $R^2$ and $R^3$ may be bonded to each other to form an alicyclic ring; and in general formula (II), $R^4$ is a $C_{1-10}$ hydrocarbon group; and $R^5$ and $R^6$ are each independently selected from the group consisting of hydrogen and $C_{1-10}$ hydrocarbon groups, but $R^5$ and $R^6$ may be bonded to each other to form an alicyclic ring; and (F) a tackifier in an amount of 5 to 20 parts by mass per 100 parts by mass total of components (A) and (B), where the tackifier is a polysiloxane that has at least 1 silicon atom-bonded alkoxy group per molecule, that has at least 1 silicon atom-bonded epoxy group-containing organic group per molecule, that has an (MeViSiO$_{2/2}$) structural unit (where Me represents a methyl group, and Vi represents a vinyl group), and that has 1 to 20% by mass (mass fraction) of vinyl groups per molecule.

In one embodiment of the present invention, the amount of the platinum group metal element in component (D) is 60 to 420 parts by mass per 1 million parts by mass total of components (A) and (B).

In one embodiment of the present invention, the curing inhibitor is selected from the group consisting of compounds represented by general formula (I) and compounds represented by general formula (II), wherein $R^1$, $R^2$, and $R^3$ in general formula (I) are each independently selected from the group consisting of methyl, ethyl, propyl, phenyl, and vinyl groups, and $R^4$, $R^5$, and $R^6$ in general formula (II) are each independently selected from the group consisting of methyl, ethyl, propyl, phenyl, and vinyl groups.

In one embodiment of the present invention, the curing inhibitor has a melting point of −20° C. or below. This embodiment also makes it possible to achieve the goal of preventing the curing inhibitor from precipitating as a result of crystallization, even during low-temperature storage, and of allowing the curing inhibitor to be uniformly dispersed and maintained in the system.

In one embodiment of the present invention, the curing inhibitor has a boiling point of 200° C. or above. In this embodiment, the curing inhibitor has low volatility, thus making it possible to achieve the goal of providing consistent curing inhibition and providing a thermally conductive composition of consistent viscosity after the thermally conductive filler has been blended therein.

In one embodiment of the present invention, the curing inhibitor is one or more compounds selected from the group consisting of methyltris(3-methyl-1-butyn-3-oxy)silane and methylvinylbis(3-methyl-1-butyn-3-oxy)silane.

In one embodiment of the present invention, the thermally conductive filler has a color that is neither colorless nor white. Silicone components generally turn brown or black in combinations of a platinum group metal-based catalyst in the above concentration and a curing inhibitor in the above concentration. Thus, in this embodiment, the thermally conductive filler has a color that is neither colorless nor white, thereby making it possible to achieve the goal of stabilizing the color tone of the thermally conductive silicone composition.

Effects of the Invention

The thermally conductive silicone composition of the present invention produces the effect of having low viscosity before curing as well as high adhesive strength and high thermal conductivity after curing.

MODE FOR CARRYING OUT THE INVENTION

Component (A) of the thermally conductive silicone composition of the present invention is an organopolysiloxane having 2 or more silicon atom-bonded alkenyl groups per molecule and no silicon atom-bonded epoxy group-containing organic groups. Examples of alkenyl groups include $C_{2-12}$ alkenyl groups such as vinyl, allyl, butenyl, pentenyl, hexenyl, heptenyl, octenyl, nonenyl, decenyl, undecenyl, and dodecenyl groups; vinyl groups are preferred. Examples of silicon atom-bonded groups other than alkenyl groups also in component (A) include $C_{1-12}$ alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; $C_{6-12}$ aryl groups such as phenyl, tolyl, xylyl, and naphthyl groups; $C_{7-12}$ aralkyl groups such as benzyl, phenethyl, and phenylpropyl groups; and groups in which some or all of the hydrogen atoms in these groups have been substituted with halogen atoms such as fluorine, chlorine, or bromine atoms.

The molecular structure of component (A) is not limited, provided that the organopolysiloxane of component (A) has two or more silicon atom-bonded alkenyl groups per molecule and does not have any silicon atom-bonded epoxy group-containing organic groups; the molecular structure may be, for example, a linear, partially branched linear, cyclic, branched, or three-dimensional network structure. In one embodiment, the molecular structure of component (A) is a linear or partially branched linear structure, and preferably a linear structure. Component (A) may be a single polymer having these molecular structures, a copolymer including these molecular structures, or mixtures of 2 or more of these polymers. In one embodiment, a small amount of hydroxyl groups or alkoxy groups may be bonded to silicon atoms in the molecule of component (A), provided that the object of the present invention is not thereby compromised. In another embodiment, component (A) does not contain any silicon atom-bonded hydroxyl groups or alkoxy groups. In one embodiment, component (A) does not contain 2 or more silicon atom-bonded hydrogen atoms per molecule. In another embodiment, component (A) does not contain any silicon atom-bonded hydrogen atoms.

Examples of linear organopolysiloxanes include dimethylpolysiloxanes capped at both ends of the molecular chain with dimethylvinylsiloxy groups, dimethylsiloxane-methylphenylsiloxane copolymers capped at both ends of the molecular chain with dimethylvinylsiloxy groups, dimethylsiloxane-methylvinylsiloxane copolymers capped at both ends of the molecular chain with dimethylvinylsiloxy groups, methylphenylpolysiloxanes capped at both ends of the molecular chain with dimethylvinylsiloxy groups, dimethylsiloxane-methylvinylsiloxane copolymers capped at both ends of the molecular chain with trimethylsiloxy groups, dimethylsiloxane-methylvinylsiloxane-methylphenylsiloxane copolymers capped at both ends of the molecular chain with trimethylsiloxy groups, and mixtures of 2 or more thereof. In one embodiment, component (A) is a dimethylpolysiloxane capped at both ends of the molecular chain with dimethylvinylsiloxy groups. In these kinds of organopolysiloxanes, small amounts of hydroxyl groups or alkoxy groups may be bonded to silicon atoms in the molecule, provided that the object of the present invention is not thereby compromised.

In one embodiment, examples of organopolysiloxanes having a branched or three-dimensional structure include organopolysiloxane resins comprising siloxane units represented by formula $R^7_3SiO_{1/2}$, siloxane units represented by formula $R^7_2R^8SiO_{1/2}$, and siloxane units represented by formula $SiO_{4/2}$.

In the formulas, $R^7$ is the same or different and is a monovalent $C_{1-12}$ hydrocarbon group having no aliphatic unsaturated bonds, where examples of monovalent hydrocarbon groups include $C_{1-12}$ alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; $C_{6-12}$ aryl groups such as phenyl, tolyl, xylyl, and naphthyl groups; $C_{7-12}$ aralkyl groups such as benzyl, phenethyl, and phenylpropyl groups; and any of these groups in which some or all of the hydrogen atoms have been substituted with halogen atoms such as fluorine, chlorine, and bromine atoms. In one embodiment, $R^7$ is a methyl group.

In the formulas, $R^8$ is a $C_{2-12}$ alkenyl group, where examples of such alkenyl groups include vinyl, allyl, butenyl, pentenyl, hexenyl, heptenyl, octenyl, nonenyl, decenyl, undecenyl, and dodecenyl groups. In one embodiment, $R^8$ is a vinyl group.

These organopolysiloxane resins comprise siloxane units represented by formula $R^7_3SiO_{1/2}$, siloxane units represented by formula $R^7_2R^8SiO_{1/2}$, and siloxane units represented by formula $SiO_{4/2}$, but may comprise siloxane units represented by formula $R^7SiO_{3/2}$, provided that the object of the present invention is not thereby compromised. In these kinds of organopolysiloxane resins, small amounts of hydroxyl groups or alkoxy groups may be bonded to silicon atoms in the molecule, provided that the object of the present invention is not thereby compromised.

The viscosity of component (A) is not particularly limited, but in the interests of ensuring that the composition has good workability, the viscosity of component (A) at 25° C. preferably ranges from 20 to 2000 mPa·s, and more preferably from 500 to 1500 mPa·s.

Component (B) of the thermally conductive silicone composition of the present invention is an organohydrogenpolysiloxane having 2 or more silicon atom-bonded hydrogen atoms per molecule. Component (B) can function as a crosslinking agent and/or chain extender. The bonding positions of the silicon atom-bonded hydrogen atoms in component (B) are not limited; the bonding positions may be the molecular chain terminals and/or the molecular chain side chains of the organohydrogenpolysiloxane. The molecular structure of component (B) is not particularly limited; the molecular structure may be, for example, a linear, partially branched linear, branched, cyclic, or three-dimensional network structure. In one embodiment, the molecular structure of component (B) is a linear or partially branched linear structure. Component (B) may be a single polymer having these molecular structures, a copolymer including these molecular structures, or mixtures of 2 or more of these polymers. Component (B) comprises a silicon atom-bonded organic group in addition to the silicon atom-bonded hydrogen atoms. In one embodiment, a small amount of hydroxyl groups or alkoxy groups may be bonded to silicon atoms in the molecule of component (B), provided that the object of the present invention is not thereby compromised. In one embodiment, component (B) does not contain any silicon atom-bonded hydroxyl groups or alkoxy groups. In one embodiment, component (B) does not contain any silicon atom-bonded epoxy group-containing organic groups.

Examples of silicon atom-bonded organic groups in component (B) include $C_{1-12}$ alkyl groups such as methyl, ethyl, propyl, butyl, pentyl, hexyl, heptyl, octyl, nonyl, decyl, undecyl, and dodecyl groups; $C_{6-12}$ aryl groups such as phenyl, tolyl, xylyl, and naphthyl groups; $C_{7-12}$ aralkyl groups such as benzyl and phenethyl groups; and groups in which some or all of the hydrogen atoms in these groups have been substituted with halogen atoms such as fluorine, chlorine, or bromine atoms, for example halogen-substituted alkyl groups such as 3-chloropropyl and 3,3,3-trifluoropropyl groups; methyl is an example of a preferred group.

Examples of component (B) include methylhydrogenpolysiloxanes capped at both ends of the molecular chain with trimethylsiloxy groups, dimethylsiloxane-methylhydrogensiloxane copolymers capped at both ends of the molecular chain with trimethylsiloxy groups, dimethylsiloxane-methylhydrogensiloxane-methylphenylsiloxane copolymers capped at both ends of the molecular chain with trimethylsiloxy groups, dimethylsiloxanes capped at both ends of the molecular chain with dimethylhydrogensiloxy groups, dimethylsiloxane-methylphenylsiloxane copolymers capped at both ends of the molecular chain with dimethylhydrogensiloxy groups, methylphenylpolysiloxanes capped at both ends of the molecular chain with dimethylhydrogensiloxy groups, cyclic methylhydrogenpolysiloxanes, organopolysiloxane copolymers comprising siloxane units represented by formula $R^9_3SiO_{1/2}$, siloxane units represented by formula $R^9_2HSiO_{1/2}$, and siloxane units represented by formula $SiO_{4/2}$, organopolysiloxane copolymers comprising siloxane units represented by formula $R^9_2HSiO_{1/2}$ and siloxane units represented by formula $SiO_{4/2}$, organopolysiloxane copolymers comprising siloxane units represented by formula: $R^9HSiO_{2/2}$ and siloxane units represented by formula $R^9SiO_{3/2}$ or siloxane units represented by formula $HSiO_{3/2}$, and mixtures of 2 or more of these organopolysiloxanes. In the formula, $R^9$ is a $C_{1-6}$ alkyl group or phenyl group, and is preferably a methyl group.

In one embodiment, the content of component (B) in the thermally conductive silicone composition of the present invention is such that the amount of silicon-bonded hydrogen atoms in component (B) is preferably 0.1 to 2.5 mols, and more preferably 0.7 to 2.5 mols, per mol silicon-bonded alkenyl groups in component (A).

Component (C) of the thermally conductive silicone composition of the present invention is a thermally conductive filler. In one embodiment of the present invention, the thermally conductive filler serving as component (C) can be included in the thermally conductive silicone composition in an amount of preferably 85 to 95% by mass, more preferably 87 to 93% by mass, and even more preferably 89 to 91% by mass, based on the total mass of the thermally conductive silicone composition. As used in the present specification, the expression "based on the total mass of the thermally conductive silicone composition" means that the % by mass of the thermally conductive filler is calculated based on the total mass of all components included in the thermally conductive silicone composition, when specifying the amount of thermally conductive filler contained in the thermally conductive silicone composition.

In one embodiment of the present invention, the thermally conductive filler serving as component (C) can be included in the thermally conductive silicone composition in an amount of preferably 68 to 90% by volume, more preferably 73 to 85% by volume, and even more preferably 76 to 80% by volume, based on the total volume of the thermally conductive silicone composition. The % by volume here is the % by volume at 25° C. As used in the present specification, the expression "based on the total volume of the thermally conductive silicone composition" means that the % by volume of the thermally conductive filler is calculated based on the total volume of the thermally conductive silicone composition, when specifying the amount of thermally conductive filler contained in the thermally conductive silicone composition.

In one embodiment of the present invention, the amount of the thermally conductive filler serving as component (C) is preferably 850 to 2000 parts by mass, more preferably 1000 to 1600 parts by mass, and even more preferably 1100 to 1500 parts by mass, per 100 parts by mass total of components (A) and (B).

Component (C) may be a single type of thermally conductive filler, and may be a combination of 2 or more thermally conductive fillers in which at least one property (such as particle shape, average particle size, particle size distribution, or type of filler) is different. In one embodiment, mixtures of thermally conductive fillers can be used. In such cases, a plurality of thermally conductive fillers of differing average particle sizes, which may be composed of the same or different chemical substances, can be used. For example, in one embodiment, a first thermally conductive filler having a larger average particle size may be used with a second thermally conductive filler having a smaller average particle size than the first filler. For example, in one embodiment, a first thermally conductive filler having a larger average particle size may be used with a second thermally conductive filler having a smaller average particle size than the first filler as well as with a third thermally conductive filler having a smaller average particle size than the second filler. The use of a plurality of thermally conductive fillers having different average particle sizes allows the filling efficiency of the thermally conductive fillers in the thermally conductive silicone composition to be improved, allows the viscosity to be lowered, and allows the thermal conductivity to be improved. For example, in one embodiment, a first aluminum filler having a larger average particle size may be used in combination with a second aluminum filler having a smaller average particle size. In one embodiment, a first aluminum filler having a larger average particle size may be used in combination with a second aluminum filler having a smaller average particle size and with a third zinc oxide filler and/or aluminum oxide filler having a smaller average particle size than the second aluminum filler.

The shape of the thermally conductive filler particles is not particularly limited, but the use of a thermally conductive filler that is round or spherical can prevent undesirable increases in viscosity caused by a high thermally conductive filler content. The average particle size of the thermally conductive filler depends on various factors, such as the type and amount of the thermally conductive filler, as well as the thickness of the joined parts of the device in which the cured product of the thermally conductive silicone composition is used. In one embodiment, the thermally conductive filler may have an average particle size in the range of preferably 0.1 to 80 micrometers, more preferably 0.1 to 50 micrometers, and even more preferably 0.1 to 10 micrometers.

Any known thermally conductive filler can be used as component (C), provided that the object of the present invention is not thereby compromised. The following materials are examples of materials forming thermally conductive fillers: metals such as bismuth, lead, tin, antimony, indium, cadmium, zinc, silver, copper, nickel, aluminum, iron, and metallic silicon; alloys such as alloys composed of 2 or more metals selected from the group consisting of bismuth, lead, tin, antimony, indium, cadmium, zinc, silver, aluminum, iron, and metallic silicon; metal oxides such as aluminum oxide, silica ($SiO_2$), silica gel, zinc oxide, silicon oxide, magnesium oxide, beryllium oxide, chromium oxide, and titanium oxide; metal hydroxides such as magnesium hydroxide, aluminum hydroxide, barium hydroxide, and calcium hydroxide; metal nitrides such as boron nitride, aluminum nitride, and silicon nitride; metal carbides such as silicon carbide, boron carbide, and titanium carbide; metal silicides such as magnesium silicide, titanium silicide, zirconium silicide, tantalum silicide, niobium silicide, chromium silicide, tungsten silicide, and molybdenum silicide; carbons such as diamond, graphite, fullerenes, carbon nanotubes, graphene, activated carbon, and amorphous carbon black; soft magnetic alloys such as Fe—Si alloys, Fe—Al alloys, Fe—Si—Al alloys, Fe—Si—Cr alloys, Fe—Ni alloys, Fe—Ni—Co alloys, Fe—Ni—Mo alloys, Fe—Co alloys, Fe—Si—Al—Cr alloys, Fe—Si—B alloys, and Fe—Si—Co—B alloys; and ferrites such as Mn—Zn ferrite, Mn—Mg—Zn ferrite, Mg—Cu—Zn ferrite, Ni—Zn ferrite, Ni—Cu—Zn ferrite, and Cu—Zn ferrite. Component (C) can preferably be a thermally conductive filler composed of material selected from the group consisting of aluminum oxide, aluminum nitride, boron nitride, zinc oxide, magnesium oxide, aluminum, silver, and copper.

In one embodiment of the present invention, the thermally conductive filler may have a color that is neither colorless nor white. Thermally conductive fillers having a color that is neither colorless nor white can be selected from any of the materials specifically listed above, for example. Examples of thermally conductive fillers having a color that is neither colorless nor white include, but are not limited to, graphite, silver, aluminum, boron nitride, and aluminum nitride.

Component (D) is a platinum group metal-based catalyst. The platinum group metal-based catalyst functions as a hydrosilylation reaction catalyst to promote curing of the thermally conductive silicone composition of the present invention. The platinum group metal-based catalyst of component (D) may contain 1 or more platinum group elements selected from the group consisting of platinum, rhodium, ruthenium, palladium, osmium and iridium. In one embodiment, examples of component (D) can include platinum-based catalysts, rhodium-based catalysts, and palladium-based catalysts. Platinum-based catalysts are preferred as component (D) in the interests of promoting the curing of the thermally conductive silicone composition of the present invention. Examples of platinum-based catalysts can include fine platinum powder, chloroplatinic acid, alcohol solutions of chloroplatinic acid, platinum-alkenylsiloxane complexes, platinum-olefin complexes, and platinum-carbonyl complexes. Examples of platinum-alkenylsiloxane complexes include 1,3-divinyl-1,1,3,3-tetramethyldisiloxane, 1,3,5,7-tetramethyl-1,3,5,7-tetravinylcyclotetrasiloxane, alkenylsiloxanes in which some of the methyl groups in these alkenylsiloxanes have been substituted with ethyl or phenyl groups, and alkenylsiloxanes in which the vinyl groups in these alkenylsiloxanes have been substituted with allyl or hexenyl groups, etc.

The content of component (D) in the thermally conductive silicone composition of the present invention is such that the platinum group metal element of component (D) is at least 50 parts by mass, and preferably 50 to 220 parts by mass, per 1 million parts by mass total of components (A) and (B). The content of component (D) in the present invention is considerably greater than the amount of platinum group metal catalyst generally used in thermally conductive silicone compositions of the prior art as disclosed in patent document 1 (Japanese Unexamined Patent Publication No. 2015-4043). This is an amount allowing the hydrosilylation reaction to be properly carried out when the amount of component (E) described below is 0.3 to 1 part by mass per 100 parts by mass total amount of components (A) and (B). In the composition of the present invention, the cured product may not have sufficient die shear strength if the content of component (D) is less than the lower limit of the above range.

Component (E) in the thermally conductive silicone composition of the present invention is one or more curing inhibitors selected from the group consisting of compounds represented by general formula (I) below and compounds represented by general formula (II) below:

[Chemical Formula 3]

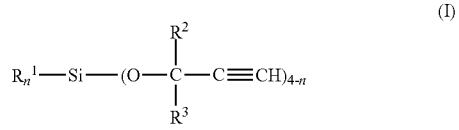

(I)

[Chemical Formula 4]

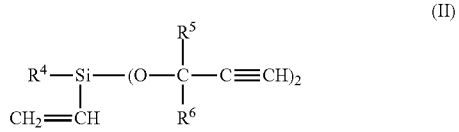

(II)

In general formula (I), n is 0 or 1, but there is no $R^1$ if n is 0; $R^1$ is a $C_{1-10}$ hydrocarbon group; and $R^2$ and $R^3$ are each independently selected from the group consisting of hydrogen and $C_{1-10}$ hydrocarbon groups, but $R^2$ and $R^3$ may be bonded to each other to form an alicyclic ring; in general formula (II), $R^4$ is a $C_{1-10}$ hydrocarbon group; and $R^5$ and $R^6$ are each independently selected from the group consisting of hydrogen and $C_{1-10}$ hydrocarbon groups, but $R^5$ and $R^6$ may be bonded to each other to form an alicyclic ring.

Examples of $C_{1-10}$ hydrocarbon groups represented by $R^1$, $R^2$, $R^3$, $R^4$, $R^5$, and $R^6$ in general formula (I) and general formula (II) each independently include alkyl, alkenyl, alkynyl, and aromatic hydrocarbon groups. Unless otherwise specified, the alkyl, alkenyl, and alkynyl groups serving as the hydrocarbon groups represented by $R^1$ through $R^6$ in general formula (I) and general formula (II) may be linear, branched or cyclic structures, and may have aromatic hydrocarbon groups as substituents. When the alkyl, alkenyl, and alkynyl groups serving as the hydrocarbon groups represented by $R^1$ through $R^6$ in general formula (I) and general formula (II) have substituents, the alkyl, alkenyl, and alkynyl groups including substituents have 10 or fewer carbon atoms. Unless otherwise specified, the aromatic hydrocarbon groups serving as the hydrocarbon groups represented by $R^1$ through $R^6$ in general formula (I) and general formula (II) may have alkyl, alkenyl, and alkynyl groups. When the aromatic hydrocarbon groups serving as the hydrocarbon groups represented by $R^1$ through $R^6$ in general formula (I) and general formula (II) have substituents, the aromatic hydrocarbon groups including substituents have 10 or fewer carbon atoms.

In one embodiment, $R^1$ in general formula (I) and $R^4$ in general formula (II) are selected from the group consisting of methyl, ethyl, n-propyl, isopropyl, phenyl, vinyl, allyl, 1-propenyl, ethynyl, and 2-propynyl groups; and $R^2$ and $R^3$ in general formula (I) and $R^5$ and $R^6$ in general formula (II) are each independently selected from the group consisting of hydrogen, and methyl, ethyl, n-propyl, isopropyl, phenyl, vinyl, allyl, 1-propenyl, ethynyl, and 2-propynyl groups. In another embodiment, $R^1$ in general formula (I) is selected from the group consisting of alkenyl or alkynyl groups such as vinyl, allyl, 1-propenyl, ethynyl, and 2-propynyl groups, and $R^2$ and $R^3$ are each independently selected from hydrogen, and alkyl and aromatic hydrocarbon groups, and preferably from hydrogen, methyl, ethyl, n-propyl, isopropyl, and phenyl groups. In another embodiment, $R^4$ in general formula (II) is selected from the group consisting of alkenyl or alkynyl groups such as vinyl, allyl, 1-propenyl, ethynyl, and 2-propynyl groups, and $R^5$ and $R^6$ are each independently selected from hydrogen, and alkyl and aromatic hydrocarbon groups, and preferably from hydrogen, methyl, ethyl, n-propyl, isopropyl, and phenyl groups. In another embodiment, $R^1$, $R^2$, and $R^3$ in general formula (I) are each independently selected from alkyl and aromatic hydrocarbon groups, and preferably from methyl, ethyl, n-propyl, isopropyl, and phenyl groups. In another embodiment, $R^4$, $R^5$, and $R^6$ in general formula (II) are each independently selected from alkyl and aromatic hydrocarbon groups, and preferably from methyl, ethyl, n-propyl, isopropyl, and phenyl groups. In another embodiment, $R^1$, $R^2$, and $R^3$ in general formula (I) are each a methyl group. In another embodiment, $R^4$, $R^5$, and $R^6$ in general formula (II) are each a methyl group. In another embodiment, $R^2$ and $R^3$ in general formula (I) may be bonded together to form an alicyclic ring, and the alicyclic ring which $R^2$ and $R^3$ are linked together to form is preferably a 5- to 7-membered ring, and more preferably a 6-membered ring. In another embodiment, $R^5$ and $R^6$ in general formula (II) may be bonded together to form an alicyclic ring, and the alicyclic ring which $R^5$ and $R^6$ are linked together to form is preferably a 5- to 7-membered ring, and more preferably a 6-membered ring. The alicyclic ring which $R^2$ and $R^3$ in general formula (I) are linked together to form as well as the alicyclic ring which $R^5$ and $R^6$ in general formula (II) are linked together to form may also have substituents, which are preferably alkyl groups.

In an embodiment of the present invention, examples of curing inhibitors include methyltris(3-methyl-1-butyn-3-oxy)silane, methylvinylbis(3-methyl-1-butyn oxy) silane, tetra(3-methyl-1-butyn-3-oxy)silane, divinylbis(3-methyl-1-butyn oxy) silane, ethyltris(3-methyl-1-butyn-3-oxy) silane, ethylvinylbis(3-methyl-1-butyn-3-oxy) silane, propyltris(3-methyl-1-butyn-3-oxy)silane, propylvinylbis(3-methyl-1-butyn-3-oxy) silane, phenyltris(3-methyl-1-butyn-3-oxy) silane, phenylvinylbis(3-methyl-1-butyn-3-oxy) silane, methyltris(3-methyl-1-pentyn-3-oxy)silane, methylvinylbis(3-methyl-1-pentyn-3-oxy)silane, tetra(3-methyl-1-pentyn-3-oxy)silane, divinylbis(3-methyl-1-pentyn-3-oxy) silane, ethyltris(3-methyl-1-pentyn-3-oxy) silane, ethylvinylbis(3-methyl-1-pentyn-3-oxy) silane, methyltris(cyclohexyl-1-ethyn-1-oxy) silane, methylvinylbis(cyclohexyl-1-ethyn-1-oxy)silane, tetra(cyclohexyl-1-ethyn-1-oxy)silane, and divinylbis(cyclohexyl-1-ethyn-1-oxy)silane.

In one embodiment of the present invention, the amount of component (E) in the thermally conductive silicone composition is 0.3 to 1 part by mass, preferably 0.5 to 1 part by mass, and more preferably 0.7 to 1 part by mass, per 100 parts by mass total of components (A) and (B). If the amount of component (E) is less than 0.3 part by mass per 100 parts by mass total of components (A) and (B), the curing inhibitor may be insufficiently effective, the viscosity of the thermally conductive silicone composition may increase, and the cured product may not have sufficient die shear strength. If the amount of component (E) is greater than 1 part by mass per 100 parts by mass total of components (A) and (B), the platinum group metal-based catalyst of component (D) may become deactivated, and the thermally conductive silicone composition may fail to cure.

Although we do not wish to be confined to any theory, it is believed that, because component (E) in the present invention has 3 or more ethynyl groups per molecule, as specified by general formula (I) above, or has two or more ethynyl groups and one or more vinyl groups per molecule, as specified by general formula (II) above, component (E) acts as a curing inhibitor under conditions where curing of the thermally conductive silicone composition would be undesirable, such as under conditions below the curing temperature, whereas component (E) behaves as a crosslinking agent and reacts with SiH groups to improve resin strength and improve the adhesive strength of the cured product of the thermally conductive silicone composition under conditions where the thermally conductive silicone composition should be cured. Although we do not wish to be confined to any theory, it is believed that component (E) is a curing inhibitor that also functions as a crosslinking agent, and therefore makes it possible to lower the amount of crosslinking agent added as an additional component to the thermally conductive silicone composition and to increase the proportion of the thermally conductive filler included in the thermally conductive silicone composition, thereby increasing the thermal conductivity while preserving the adhesive strength of the cured product of the thermally conductive silicone composition.

In one embodiment of the present invention, the total mass fraction of ethynyl groups and vinyl groups per molecule (as the total mass fraction of vinyl groups, assuming 1 ethynyl group to be equal to 2 vinyl groups) in component (E) is preferably 45% by mass or more, and more preferably 50% by mass or more, per molecule. Although we do not wish to be confined to any theory, it is believed that, because component (E) in this embodiment has a high mass fraction of ethynyl groups and, in some cases, vinyl groups, the number of crosslinks per silicone component in the thermally conductive silicone composition can be increased, consequently allowing the above effects produced by the present invention to be achieved.

Compounds represented by general formulas (I) and (II) can be synthesized in accordance with known methods of synthesis, such as the methods disclosed in patent document 7 (Japanese Translation of PCT International Application Publication No. 2009-523856) and patent document 8 (Specification of European Patent Application Publication No. 0764703A2). For example, compounds of general formula (I) can be prepared by the silylation of alcohols, where $R^1_n SiCl_{4-n}$ is reacted with HO—$CR^2R^3$—C≡CH. For example, compounds of general formula (II) can be prepared by the silylation of alcohols, where $R^4(CH_2\!=\!CH\!-\!)SiCl_2$ is reacted with HO—$CR^5R^6$—C≡CH. In the reactions in these examples, $R^1$, $R^2$, $R^3$, $R^4$, $R^5$, $R^6$, and n are the same as noted above.

In one embodiment of the present invention, the curing inhibitor has a melting point of −20° C. or below. Examples of curing inhibitors having a melting point of −20° C. or below include methyltris(3-methyl-1-butyn-3-oxy)silane and methylvinylbis(3-methyl-1-butyn-3-oxy)silane. The melting point in the present invention is the melting point at 1 atm.

In one embodiment of the present invention, the curing inhibitor has a boiling point of 200° C. or above. Examples of curing inhibitors having a boiling point of 200° C. or above include methyltris(3-methyl-1-butyn-3-oxy)silane (boiling point: 250° C.). The boiling point in the present invention is the boiling point at 1 atm.

Component (F) of the thermally conductive silicone composition of the present invention is a tackifier. In one embodiment, the tackifier of the present invention is a polysiloxane that has at least 1 silicon atom-bonded alkoxy group per molecule, that has at least 1 silicon atom-bonded epoxy group-containing organic group per molecule, that has an (MeViSiO$_{2/2}$) structural unit (where Me represents a methyl group, and Vi represents a vinyl group), and that has 1 to 20% by mass (mass ratio) of vinyl groups per molecule. The mass fraction of vinyl groups per molecule of the polysiloxane of component (F) is preferably 1 to 20% by mass, and more preferably 5 to 10% by mass. The tackifier has the function of improving the adhesion of the thermally conductive silicone composition to substrates. Although we do not wish to be confined to any theory, it is believed that, because the tackifier in the thermally conductive silicone composition of the present invention has at least a certain amount of structural units having vinyl groups in the polysiloxane chain, and because the tackifier is also used in a greater amount than the amount commonly used (an amount that does not significantly affect the curing speed of the composition, such as about 2% by mass of the total amount of components (A) and (B)), a greater number of tackifier vinyl groups coordinate to Pt, thereby slowing down the curing of the thermally conductive silicone composition.

Examples of alkoxy groups contained in the polysiloxane of component (F) include methoxy, ethoxy, propoxy, and methoxyethoxy groups, but methoxy groups are preferred. As used in the present specification, the expression "silicon atom-bonded epoxy-containing organic groups" refers to epoxy-containing organic groups that are bonded to silicon atoms via carbon atoms in the epoxy-containing organic groups. In one embodiment of the present invention, the "epoxy group-containing organic groups" are oxirane ring-containing organic groups, and preferably oxirane ring-containing alkyl groups. Examples of epoxy group-containing organic groups include, but are not limited to: glycidoxy alkyl groups such as 2-glycidoxyethyl, 3-glycidoxypropyl and 4-glycidoxybutyl groups; epoxycyclohexylalkyl groups such as 2-(3,4-epoxycyclohexyl)-ethyl and 3-(3,4-epoxycyclohexyl)-propyl groups; and oxiranylalkyl groups such as 3,4-epoxybutyl (also called 4-oxiranylbutyl) and 7,8-epoxyoctyl (also called 8-oxiranyloctyl) groups. Examples of groups other than silicon atom-bonded alkoxy groups and epoxy group-containing organic groups in the polyoxysilane serving as the tackifier include: substituted or unsubstituted monovalent hydrocarbon groups such as alkyl groups, alkenyl groups, aryl groups, aralkyl groups, and alkyl halide groups; (meth)acrylic group-containing monovalent organic groups such as 3-methacryloxypropyl groups; and hydrogen atoms. The molecular structure of the polysiloxane serving as the tackifier may be, for example, a linear, partially branched linear, branched, cyclic, or network structure, where linear, branched, and network structures are particularly preferred. The term "(meth)acrylic," as used here in the present specification, means acrylic and/or methacrylic. The term "polysiloxane" for component (F), as used in the present specification, encompasses not only siloxane polymers but also siloxane oligomers.

The polysiloxane of component (F) serving as the tackifier can also include any structural units in addition to the structural unit ($MeViSiO_{2/2}$) (where Me represents a methyl group, and Vi represents a vinyl group), provided that the object of the present invention is not thereby compromised. Examples of tackifiers include reaction mixtures of: a vinyl group- and methyl group-containing diorganosiloxane oligomer capped at both ends of the molecular chain with silanol groups, such as dimethylsiloxane-methylvinylsiloxane copolymer oligomers capped at both ends of the molecular chain with silanol groups and methylvinylsiloxane oligomers capped at both ends of the molecular chain with silanol groups; and an epoxy group-containing alkoxysilane, such as 3-glycidoxypropyltrimethoxysilane or 2-(3,4-epoxycyclohexyl)ethyltrimethoxysilane. A preferred example of component (F) is a reaction mixture of: a vinyl group- and methyl group-containing diorganosiloxane oligomer capped at both ends of the molecular chain with silanol groups, such as a dimethylsiloxane-methylvinylsiloxane copolymer oligomer capped at both ends of the molecular chain with silanol groups or a methylvinylsiloxane oligomer capped at both ends of the molecular chain with silanol groups; and an epoxy group-containing alkoxysilane. In one embodiment, component (F) can be a siloxane compound represented by the formula

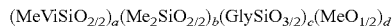

(in the formula Me represents a methyl group, Vi represents a vinyl group, Gly represents a 3-glycidoxypropyl group, a, c, and d are positive numbers, and b is 0 or a positive number).

The tackifier is preferably in the form of a low-viscosity solution, the viscosity of which is not limited but is preferably in the range of 1 to 500 mPa s at 25° C. The content of the tackifier in the above composition is preferably 5 to 20 parts by mass, and more preferably 8 to 15 parts by mass, per 100 parts by mass total of components (A) and (B).

In one embodiment of the present invention, the thermally conductive silicone composition may further contain a surface treatment agent as component (G). Treating the surface of the thermally conductive filler with a surface treatment agent can further improve the dispersibility of the thermally conductive filler in the composition and further improve the handling and moldability of the composition. Surface treatment agents that can be used in the present invention are not particularly limited, and known surface treatment agents can be used. Examples of surface treatment agents include the oligosiloxanes disclosed in patent document 9 (Japanese Unexamined Patent Publication No. 2001-139815) and the organosiloxanes represented by the following general formula (III) disclosed in patent document 10 (Japanese Patent No. 6590445). In one embodiment, component (G) does not contain any silicon atom-bonded epoxy group-containing organic groups.

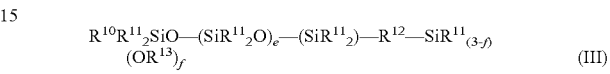
(III)

In formula (III), $R^{10}$ is an unsubstituted or halogen-substituted monovalent hydrocarbon group such as a linear alkyl group, a branched alkyl group, a cyclic alkyl group, an alkenyl group, an aryl group, an aralkyl group, or a halogenated alkyl group; $R^{11}$, which may be the same as or different from each other, are monovalent hydrocarbon groups having no aliphatic unsaturated bonds, such as linear alkyl groups, branched alkyl groups, cyclic alkyl groups, aryl groups, aralkyl groups, or halogenated alkyl groups; $R^{12}$ is an oxygen atom or a divalent hydrocarbon group, examples of which include alkylene groups such as ethylene, propylene, butylene, pentylene, and hexylene groups, and alkylenearylenealkylene groups such as ethylenephenyleneethylene and ethylenephenylenepropylene groups; $R^{13}$ is an alkyl group, an alkoxyalkyl group, an alkenyl group, or an acyl group; e is an integer of 1 or more, and preferably 1 to 200; and f is an integer from 1 to 3. In another embodiment, component (F) may be an organosiloxane in which —$R^{12}$—$SiR^{11}_{(3-f)}(OR^{13})_f$ in formula (III) above is —O-(divalent hydrocarbon group)-$SiR^{11}_{(3-f)}(OR^{13})_f$.

The amount of the surface treatment agent is not particularly limited, provided that the amount allows the properties of the above surface treatment agent to be sufficiently exhibited, but is preferably 0.01 to 10 parts by mass, and more preferably 0.1 to 2 parts by mass, per 100 parts by mass of component (C).

In addition to the above components, optional components other than the above components may also be included in the thermally conductive silicone composition, provided that the object of the present invention can be achieved. Examples of optional ingredients can include pigments, dyes, fluorescent dyes, heat resistant additives, flame retardants such as triazole compounds, and plasticizers.

The method for producing the thermally conductive silicone composition of the present invention is not particularly limited. The thermally conductive silicone composition of the present invention can be produced in accordance with conventional methods for producing silicone compositions that contain thermally conductive fillers. Known mixing/stirring devices such as kneaders, Ross mixers, Hobart mixers, and dental mixers can be used when mixing the thermally conductive filler with silicone components and the like. Given the high content of the thermally conductive filler in the thermally conductive silicone composition of the present invention, the use of a kneader, Ross mixer, or dental mixer, etc., that is capable of providing high shearing force allowing the thermally conductive filler to be efficiently dispersed is preferred. In the production process, components (A), (B) and (D) are preferably cooled while mixed in the presence of any thermally conductive fillers with which the progress of the hydrosilylation reaction may be a concern. The cooling is more preferably carried out in such a way that the temperature of the composition is ambient temperature. When the thermally conductive filler is treated with a surface treatment agent, a thermally conductive filler that has previously been treated with a surface treatment agent may be mixed with the other components, including component (A), or a thermally conductive filler that has not been treated with a surface treatment agent may be simultaneously treated with a surface treatment agent when mixed with the other components, including component (A). As an example, the thermally conductive silicone composition of the present invention can be prepared by a series of steps, where component (A) is stirred into a kneader under nitrogen, component (C) is introduced into the kneader and stirred for a certain period of time while heated (to between 100° C. and 140° C., for example) in vacuo (<10 mmHg, for example), the pressure is returned to normal and the contents are cooled, at which time component (E) is stirred in, component (B) is introduced into the kneader and is stirred for a certain period of time while cooled at normal pressure, component (D) is introduced into the kneader and is stirred for a certain period of time while cooled at normal pressure, the contents continue to be stirred while cooled at reduced pressure, the pressure is then returned to normal after the completion of stirring, and the resulting thermally conductive silicone composition is recovered.

The thermally conductive silicone composition of the present invention can be applied, for example, between a heat-generating member, such as an integrated circuit (IC), and a heat-dissipating member, such as a heat spreader. A cured body obtained by curing the applied composition allows heat to be efficiently transferred from the heat-generating member to the heat-dissipating member. The conditions under which the thermally conductive silicone composition of the present invention is cured are not particularly limited; the composition may be cured by being heated to between 50 and 200° C., preferably between 100 and 180° C., and more preferably between 120 and 150° C.

EXAMPLES

The thermally conductive silicone composition of the present invention is illustrated in detail by, but is not limited to, the descriptions in the following examples.

The various properties of the thermally conductive silicone compositions and their cured products in the examples and comparative examples were determined as follows.

Viscosity

The viscosity of the thermally conductive silicone compositions was determined at 25° C. using a rotary viscometer (Anton Paar MCR 302, by Anton Paar GmbH). The viscosity of thermally conductive silicone compositions prepared by stirring the components of the thermally conductive silicone composition is shown, as "viscosity after mixing," in Table 1.

Die Shear Strength

The adhesive properties of cured polysiloxane were assessed by determining the adhesive strength of cured silicone (obtained by curing thermally conductive silicone compositions for 2 hours at 150° C.) on an aluminum heat-dissipating substrate (at a square area (36 mm²) where the two parts were attached to each other) using a Bond Tester SS-100KP by Seishin Trading Co., Ltd.

Assessment of thermal Conductivity

The hot-disk type Thermophysical Properties Analyzer TPS-2500-S by Kyoto Electronics Manufacturing Co., Ltd., was used to determine the thermal conductivity of cured silicone (10 mm×60 mm×30 mm) obtained by curing thermally conductive silicone compositions for 2 hours at 150° C.

Determination of Scorch Time (Ts1) and 90% Vulcanization Time (Tc(90))

Thermally conductive silicone compositions were vulcanized for 600 seconds at a common die bonding temperature (150° C.), and the ts1 and tc(90) were determined using a curelastometer (Premier MDR, by Alpha Technologies) in accordance with the method specified in JIS K 6300-2:2001 "Rubber, unvulcanized—Physical property—Part 2: Determination of cure characteristics with oscillating curemeters." Measurements were started when thermally conductive silicone compositions (5 ml) had been placed on the lower die, and the upper die had been closed thereon. Measurements were performed using an R-type die for rubber at an amplitude angle of 0.5°, a frequency of 100 times/minute, and a maximum torque range of 230 kgf·cm.

Increase in Viscosity During Mixing

No increase in viscosity during mixing was defined as when the material in the kneader reached a viscosity no greater than 300 Pa s during the preparation of thermally conductive silicone compositions, whereas an increase in viscosity during mixing was defined as a viscosity greater than 300 Pa s. In the table, "No" indicates no increase in viscosity, and "increased" indicates an increase in viscosity.

The following components were used in the examples and comparative examples.

The following component was used as component (A).

Component (a1): Dimethylpolysiloxane capped at both ends of the molecular chain with dimethylvinylsiloxy groups (number-average molecular weight (Mn)=18000; number of dimethylsiloxane units=200) (the mass fraction of silicon atom-bonded vinyl groups per molecule was 0.4% by mass based on molecular mass).

The following components were used as component (B).

Component (b1): Dimethylpolysiloxane capped at both ends of the molecular chain with dimethylhydrogensiloxy groups (the mass fraction of silicon atom-bonded hydrogen atoms per molecule was 0.14% by mass based on molecular mass). Component (b1) can function as a chain extender.

Component (b2): Dimethylpolysiloxane-methylhydrogensiloxane copolymer capped at both ends of the molecular chain with trimethylsiloxy groups (the mass fraction of silicon atom-bonded hydrogen atoms per molecule was 1.59% by mass based on molecular mass). Component (b2) can function as a crosslinker.

The following components were used as component (C).

Component (c1): Aluminum filler ($D_{50}$=17 μm; A19-1331, by Toyo Aluminum K.K.) (as used in the present specification, $D_{50}$ is the value of the particle diameter at 50% in the cumulative distribution).

Component (c2): Aluminum filler ($D_{50}$=2 μm; TCP2, by Toyo Aluminum K.K.)

Component (c3): ZnO filler ($D_{50}$=0.12 µm; ZoCo102, by ZoChem)

Aluminum oxide filler (brand name: Advanced Alumina AA04 (by Sumitomo Chemical Co., Ltd.)) could also be used, in addition to zinc oxide, in the examples of the present invention.

The following component was used as component (D).

Component (d1): Pt catalyst (Pt-VTSC-3.0 IPA, by Umicore Japan; a solution of a platinum complex in isopropyl alcohol, the Pt concentration of which is 3% by mass)

The following components were used as component (E).

Component (e1): Methyltris(3-methyl-1-butyn-3-oxy)silane (JH-AkSi-1) (Component (e1) corresponds to the curing inhibitor of the present invention.)

Component (e2): Tetramethyltetravinylcyclotetrasiloxane (Component (e2) is a curing inhibitor used in comparative examples that does not correspond to the curing inhibitor of the present invention.)

Component (e3): 1-ethynyl-1-cyclohexanol (Component (e3) is a curing inhibitor used in comparative examples that does not correspond to the curing inhibitor of the present invention.)

(F) The following component was used as a tackifier.

Component (f1): Siloxane compound represented by the following formula $$(MeViSiO_{2/2})_8(Me_2SiO_{2/2})_{19}(GlySiO_{3/2})_{38}(MeO_{1/2})_x$$

In the formula, Me represents a methyl group, Vi represents a vinyl group, Gly represents a 3-glycidoxypropyl group, and x represents a positive integer of 1 or more. The mass fraction of vinyl groups per molecule was 5.63% by mass.

(G) The following component was used as a surface treatment agent.

Component (g1): Polydimethylsiloxane having the following formula:

$$(CH_3O)_3Si-(C_2H_4)_x-(O-Si(CH_3)_2)_n-C_4H_9$$

In the formula, n is 58-65, and x is 3.

The thermally conductive silicone compositions of the examples and comparative examples were prepared by the following procedures.

Component (a1) was introduced into a kneader (bench-top kneader SNV-1H, by Irie Shokai Co., Ltd.).

As the contents were purged with nitrogen and stirred, component (g1) as well as components (c1) and (c2) were introduced into the kneader, and the contents continued to be stirred (rotating speed: 1/sec; stirring time: 0.25 hour; temperature: ambient temperature).

Nitrogen purging was stopped, and component (c3) was introduced into the kneader.

The contents of the kneader were heated to 120° C. and were stirred at reduced pressure (<10 mmHg) for 2 hours, resulting in a temperature of 140° C.

The pressure inside the kneader was returned to normal, component (e1), (e2), or (e3) was introduced as a curing inhibitor into the kneader, and the contents were stirred for 0.5 hour at normal pressure and room temperature. In this step, the contents of the kneader were stirred while cooled to room temperature.

Components (b1), (b2), (d1), and (f1) were introduced into the kneader. Component (f2), if used, was also introduced into the kneader.

The contents were stirred for 0.5 hour at normal pressure and room temperature. In this step, the contents of the kneader were stirred while cooled to room temperature.

The contents were stirred for 0.5 hour at reduced pressure (<10 mmHg) and room temperature. In this step, the contents of the kneader were stirred while cooled to room temperature.

After stirring had been completed, the pressure was returned to normal, and the thermally conductive silicone composition was taken out of the kneader.

Table 1 shows the parts by weight, amounts, and proportions of the components that were used to produce the thermally conductive silicone compositions in the examples and comparative examples, as well as the properties of the resulting thermally conductive silicone compositions and cured products thereof.

H/Vi in Table 1 indicates the [total number of silicon atom-bonded hydrogen atoms in component (B)]/[(total number of silicon atom-bonded vinyl groups in component (A))+(total number of ethynyl groups×2+total number of vinyl groups in component (E))]. When the curing inhibitor of the present invention (Example 1) was compared with the curing inhibitors of the comparative example (Comparative Examples 1 and 2), the amount of each curing inhibitor was adjusted to give the same H/Vi values. In Examples 1 through 3 and Comparative Examples 1 through 4, there were 2.1 mols silicon atom-bonded hydrogen atoms in component (B) per 1 mol silicon atom-bonded alkenyl groups in component (A).

Pt(ppm)/[(A)(B)] in Table 1 indicates the parts by mass of platinum in component (D) per 1 million parts by mass total of components (A) and (B) in the composition. (As used in the present specification, the term "ppm" represents parts per million, and 1 ppm represents 1 part per million.)

Pt(ppm)/[(A)(B)(E)(F)(G)] in Table 1 indicates the parts by mass of platinum in component (D) per 1 million parts by mass total of components (A), (B), (E), (F), and (G) in the composition.

"Filler content (% by volume)" in Table 1 indicates the percentage of the total volume of components (c1), (c2), and (c3) based on the total volume of the thermally conductive silicone composition at 25° C.

"Filler content (% by mass)" in Table 1 indicates the percentage of the total mass of components (c1), (c2), and (c3) based on the total mass of the thermally conductive silicone composition.

TABLE 1

| | | | | Example 1 | Example 2 | Example 3 | Comparative Example 1 | Comparative Example 2 | Comparative Example 3 | Comparative Example 4 |
|---|---|---|---|---|---|---|---|---|---|---|
| Components of composition (parts by mass) | Component (A) | Component (a1) | Vi polysiloxane | 7.38 | 7.38 | 7.38 | 7.38 | 7.38 | 7.38 | 7.38 |
| | Component (B) | Component (b1) | SiH chain extender | 0.70 | 0.70 | 0.70 | 0.70 | 0.70 | 0.70 | 0.70 |
| | | Component (b2) | Crosslinking agent | 0.08 | 0.08 | 0.08 | 0.08 | 0.08 | 0.08 | 0.08 |

TABLE 1-continued

| | | | Example 1 | Example 2 | Example 3 | Comparative Example 1 | Comparative Example 2 | Comparative Example 3 | Comparative Example 4 |
|---|---|---|---|---|---|---|---|---|---|
| Component (C) | Component (c1) | Al filler (D50 = 17 μm) | 51.28 | 51.28 | 51.28 | 51.28 | 51.28 | 51.28 | 51.28 |
| | Component (c2) | Al filler (D50 = 2 μm) | 25.64 | 25.64 | 25.64 | 25.64 | 25.64 | 25.64 | 25.64 |
| | Component (c3) | ZnO filler (D50 = 0.12 μm) | 13.08 | 13.08 | 13.08 | 13.08 | 13.08 | 13.08 | 13.08 |
| Component (D) | Component (d1) | Pt catalyst | 0.067 | 0.017 | 0.067 | 0.067 | 0.067 | 0.0067 | 0.067 |
| Component (E) | Component (e1) | Curing inhibitor 1 (present invention) | 0.06 | 0.06 | 0.03 | | | 0.06 | 0.006 |
| | Component (e2) | Curing inhibitor 2 (comparative) | | | | | 0.108 | | |
| | Component (e3) | Curing inhibitor 3 (comparative) | | | | | | 0.076 | |
| Component (F) | Component (f1) | Tackifier | 1.00 | 1.00 | 1.00 | 1.00 | 1.00 | 1.00 | 1.00 |
| Component (G) | Component (g1) | Surface treatment agent | 0.71 | 0.71 | 0.71 | 0.71 | 0.71 | 0.71 | 0.71 |
| Weight and weight ratio | | Total (parts by mass) | 100.0 | 99.9 | 100.0 | 100.0 | 100.0 | 99.9 | 99.9 |
| | | H/Vi | 0.97 | 0.97 | 1.32 | 0.97 | 0.97 | 0.97 | 1.85 |
| | | Pt (ppm)/[(A)(B)] | 246.3 | 62.5 | 246.3 | 246.3 | 246.3 | 24.6 | 246.3 |
| | | Pt (ppm)/[(A)(B)(E)(F)(G)] | 200.1 | 50.0 | 200.7 | 199.1 | 199.7 | 20.2 | 201.1 |
| | | Filler content (vol %) | 76.9% | 77.0% | 77.0% | 76.9% | 76.9% | 77.0% | 77.0% |
| | | Filler content (mass %) | 90.0% | 90.0% | 90.0% | 90.0% | 90.0% | 90.1% | 90.1% |
| Characteristics | | Viscosity after mixing (Pa·s) | 106 | 111 | 124 | 200~ | 200~ | 101 | 200~ |
| | | Die shear strength (N/cm$^2$) | 334 | 349 | 369 | 84 | 70 | 129 | 63 |
| | | Thermal conductivity (W/m·K) | 3.8 | 3.8 | 3.8 | 3.8 | 3.8 | 3.8 | 3.8 |
| | | Increase in viscosity during mixing | None | None | None | Increase | Increase | None | Increase |
| | | Scorch time (seconds) | 26 | 45 | 22 | 2 | 4 | 600< | 7 |

The results of Examples 1 through 3 show that the thermally conductive silicone composition of the present invention produced the beneficial effect of being able to achieve a high thermal conductivity greater than 3.0 W/m·K, a low composition viscosity (<150 Pa·s) after the components have been mixed, and a high die shear strength greater than 300 N/cm$^2$.

On the other hand, when the curing inhibitor was not the compound specified in the present invention (Comparative Examples 1 and 2), the viscosity of the resulting thermally conductive silicone compositions was too high, and the die shear strength of the cured product was also low, making these compositions unsuitable for use as a thermal interface material.

When the amount of the platinum group metal-based catalyst was under the lower limit of the range specified in the present invention (Comparative Example 3), the die shear strength of the cured product was low, making this composition unsuitable for use as a thermal interface material.

When the amount of the curing inhibitor was under the lower limit of the range specified in the present invention (Comparative Example 4), the viscosity of the resulting thermally conductive silicone compositions was too high, and the die shear strength of the cured product was also low, making this composition unsuitable for use as a thermal interface material.

INDUSTRIAL APPLICABILITY

The thermally conductive silicone composition of the present invention can be used as a thermal interface material, etc.

The invention claimed is:
1. A thermally conductive composition comprising the following components (A) through (F):
(A) an organopolysiloxane having 2 or more silicon atom-bonded alkenyl groups per molecule and having no silicon atom-bonded epoxy group-containing organic groups;
(B) an organohydrogenpolysiloxane having 2 or more silicon atom-bonded hydrogen atoms per molecule, in an amount resulting in 0.1 to 2.5 mols of silicon atom-bonded hydrogen atoms in component (B) per mol silicon atom-bonded alkenyl groups in component (A);
(C) a thermally conductive filler in an amount resulting in 85 to 95% by mass based on the total mass of the thermally conductive composition;
(D) a platinum group metal-based catalyst in an amount resulting in at least 50 parts by mass of a platinum group metal element in component (D) per 1 million parts by mass total of components (A) and (B);
(E) one or more curing inhibitors selected from the group consisting of compounds represented by general formula (I) below and compounds represented by general formula (II) below, in an amount resulting in 0.3 to 1 part by mass per 100 parts by mass total of components (A) and (B);

[Chemical Formula 1]

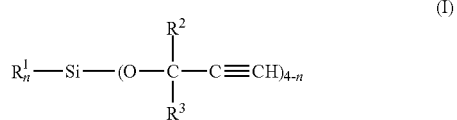

[Chemical Formula 2]

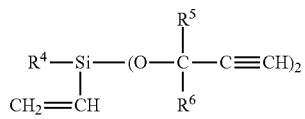

(II)

where, in general formula (I), n is 0 or 1, but there is no $R^1$ if n is 0; $R^1$ is a $C_{1-10}$ hydrocarbon group; and $R^2$ and $R^3$ are each independently selected from the group consisting of hydrogen and $C_{1-10}$ hydrocarbon groups, but $R^2$ and $R^3$ may be bonded to each other to form an alicyclic ring; and in general formula (II), $R^4$ is a $C_{1-10}$ hydrocarbon group; and $R^5$ and $R^6$ are each independently selected from the group consisting of hydrogen and $C_{1-10}$ hydrocarbon groups, but $R^5$ and $R^6$ may be bonded to each other to form an alicyclic group; and (F) a tackifier in an amount of 5 to 20 parts by mass per 100 parts by mass total of components (A) and (B), where the tackifier is a polysiloxane that has at least 1 silicon atom-bonded alkoxy group per molecule, that has at least 1 silicon atom-bonded epoxy group-containing organic group per molecule, that has an (MeViSiO$_{2/2}$) structural unit (where Me represents a methyl group, and Vi represents a vinyl group), and that has 1 to 20% by mass (mass fraction) of vinyl groups per molecule.

2. The thermally conductive composition as claimed in claim 1, wherein the amount of the platinum group metal element in component (D) is 60 to 420 parts by mass per 1 million parts by mass total of components (A) and (B).

3. The thermally conductive composition as claimed in claim 1, wherein $R^1$, $R^2$, and $R^3$ in general formula (I) are each independently selected from the group consisting of methyl, ethyl, propyl, phenyl, and vinyl groups, and $R^4$, $R^5$, and $R^6$ in general formula (II) are each independently selected from the group consisting of methyl, ethyl, propyl, phenyl, and vinyl groups.

4. The thermally conductive composition as claimed in claim 1, wherein the curing inhibitor has a melting point of −20° C. or below.

5. The thermally conductive composition as claimed in claim 1, wherein the curing inhibitor has a boiling point of 200° C. or above.

6. The thermally conductive composition as claimed in claim 1, wherein the curing inhibitor is one or more compounds selected from the group consisting of methyltris(3-methyl-1-butyn-3-oxy)silane and methylvinylbis(3-methyl-1-butyn-3-oxy)silane.

7. The thermally conductive composition as claimed in claim 1, wherein the curing inhibitor has a color that is neither colorless nor white.

* * * * *